INVENTOR.
HANS G. STENGER
BY SPENCER L BLAYLOCK JR.
& W. A. SCHAICH
ATTORNEYS

June 15, 1965  H. G. STENGER  3,188,691
INJECTION MOLDING MACHINE
Filed April 6, 1962  5 Sheets-Sheet 4

INVENTOR.
HANS G. STENGER
BY SPENCER L. BLAYLOCK JR.
& W. A. SCHAICH
ATTORNEYS

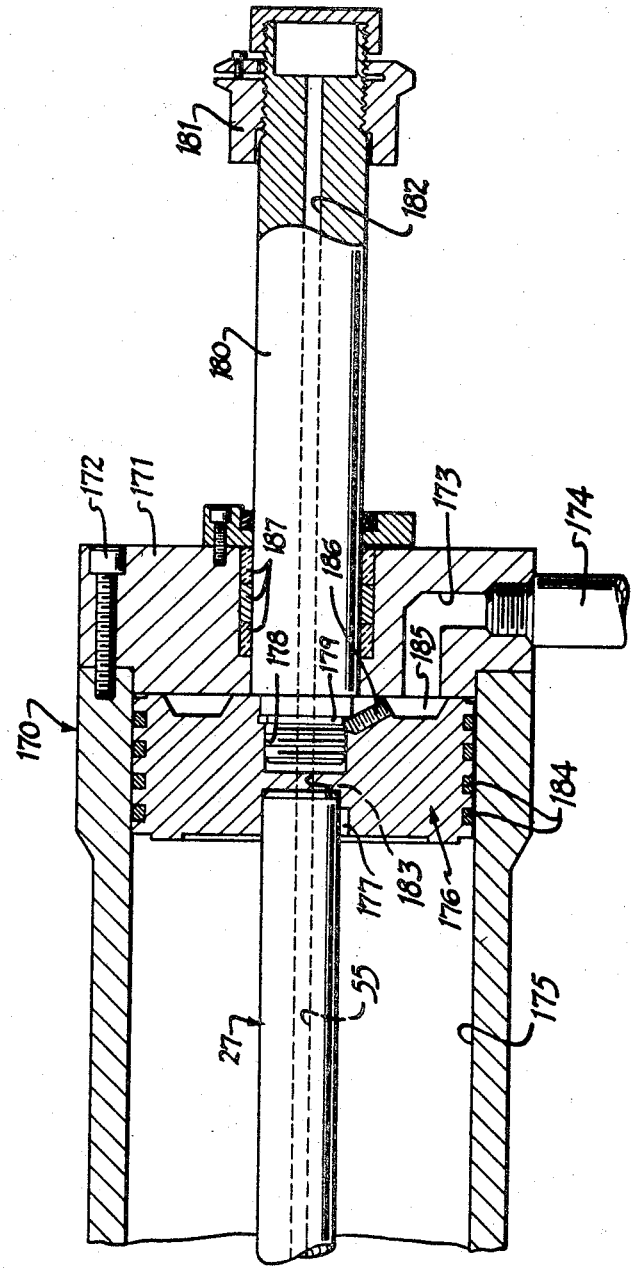

United States Patent Office 3,188,691
Patented June 15, 1965

3,188,691
INJECTION MOLDING MACHINE
Hans G. Stenger, Lambertville, Mich., assignor to Owens-Illinois Glass Company, a corporation of Ohio
Filed Apr. 6, 1962, Ser. No. 185,756
7 Claims. (Cl. 18—30)

The present invention relates to an apparatus for molding plastic materials. More specifically, the present invention relates to an apparatus for and method of molding plasticized materials by means of a plasticizing screw which is both axially and rotatably displaceable in a predetermined sequence during a molding cycle.

In the molding of plastic materials, the use of screw-plasticizers has long been recognized as an efficient means of thoroughly masticating and admixing plastic materials, particularly thermoplastic materials in order to reduce them to a formable, molten or plasticized state. Such screw-type plasticizers have normally been limited to utilization in the extrusion of plasticized materials i.e. the expression of such materials through an orifice and into the open air or other chilling medium, although some limited utilization of screw-plasticizers has been made to supply plasticized material to a conventional piston-type injection molding apparatus. Recently, there have been developed so-called "reciprocating screw"-type machines in which a continuously driven plasticizer screw is axially displaced toward a mold to serve as an injection ram for displacing into a mold cavity plasticized material previously accumulated between the screw and the mold. Such continuously rotating screws have not been satisfactory in use because of their relative inflexibility (due to the necessity of continuously reciprocating the screw in one direction or the other) and because of the lack of control mechanisms sufficiently adaptable to permit utilization of the rotatable, axially displaceable screw in variable forming sequences. All in all, the utility of machines of this type has been seriously handicapped because of the inadequate control mechanisms utilized in conjuction therewith.

The present invention now provides a new and novel plasticizing screw-type molding machine having a screw which is intermittently rotatable and also intermittently longitudinally displaceable, together with an improved control mechanism well adaptable to practically any desired molding sequence.

One major feature of the apparatus of the present invention is the control of rotation of the plasticizer screw, the screw being rotatable only during the accumulation of plasticized material for subsequent introduction into the mold. In this manner, there is no necessity for continuously driving the screw, the screw can function as a true ram during its forward displacement toward the mold, and it becomes possible to avoid continuous reciprocation of the screw since the screw can simply be stopped against rotation when in its retracted position after material is accumulated for the next mold charge. Additionally, the screw of the present invention is preferably driven by a fluid-pressure actuated motor so that the control of the motor can be easily and fully integrated into the overall fluid pressure actuation mechanism for axial screw displacement.

The axial displacement of the screw is accomplished by utilization of a single acting fluid pressure actuated cylinder which is power actuated in a direction to displace previously accumulated plasticized material into the mold and which resists displacement of the screw in the reverse direction by virtue of the pressure of material accumulated upon subsequent screw rotation. Thus, the back pressure in the single acting fluid pressure actuated cylinder affords a simple and effective control over the pressure at which the plasticized material is accumulated for the next subsequent mold charge. A novel and inexpensive mechanism is also provided for both axially and rotationally displacing the screw.

Additionally, there is interposed between the screw and the mold a valve controlling communication therebetween. This valve is opened substantially simultaneously with the initiation of screw displacement toward the mold and is closed substantially simultaneously with both termination of screw displacement toward the mold and initiation of rotation of the screw.

By providing the integrated control system of the present invention which effectively and flexibly correlates the three factors of (1) axial displacement of the screw, (2) rotational displacement of the screw and (3) opening and closing of the valve, it is possible to provide an improved apparatus for molding plasticized material.

It is, therefore, an important object of the present invention to provide a new and improved apparatus for molding plasticized material, the apparatus being of the axially and rotationally displaceable screw-type.

It is a further object of the present invention to provide a new and improved apparatus wherein an axially displaceable and rotatable plasticizer screw is displaced in a desired and variable sequence by means of an improved control system.

Yet another, and no less important, object of the present invention is the provision of an apparatus for molding plasticized material including a screw axially displaceable toward a mold to express plasticized material thereinto and which is subsequently rotated and axially displaced in a reverse direction to accumulate a next successive mold charge.

Other objects of this invention will appear in the following description and appended claims, reference being had to the accompanying drawings forming a part of this specification wherein like reference characters designate corresponding parts in the several views.

FIGURE 5 is a view similar to FIGURE 2, illustrating a different actuating cylinder and piston arrangement.

Figure 1:
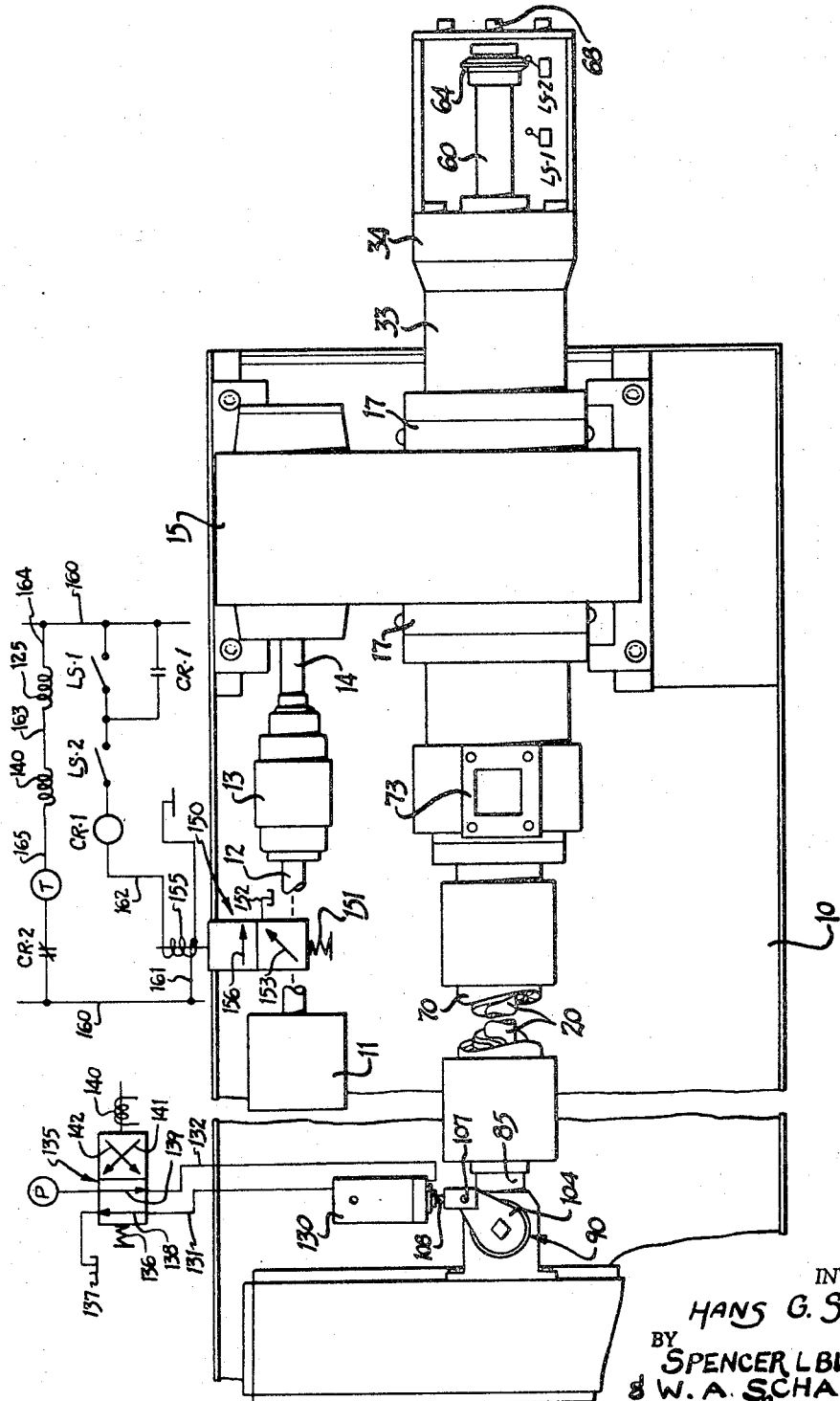
FIGURE 1 is a plan view, somewhat schematic in nature, of an apparatus of the present invention capable of carrying out the method of the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 3:
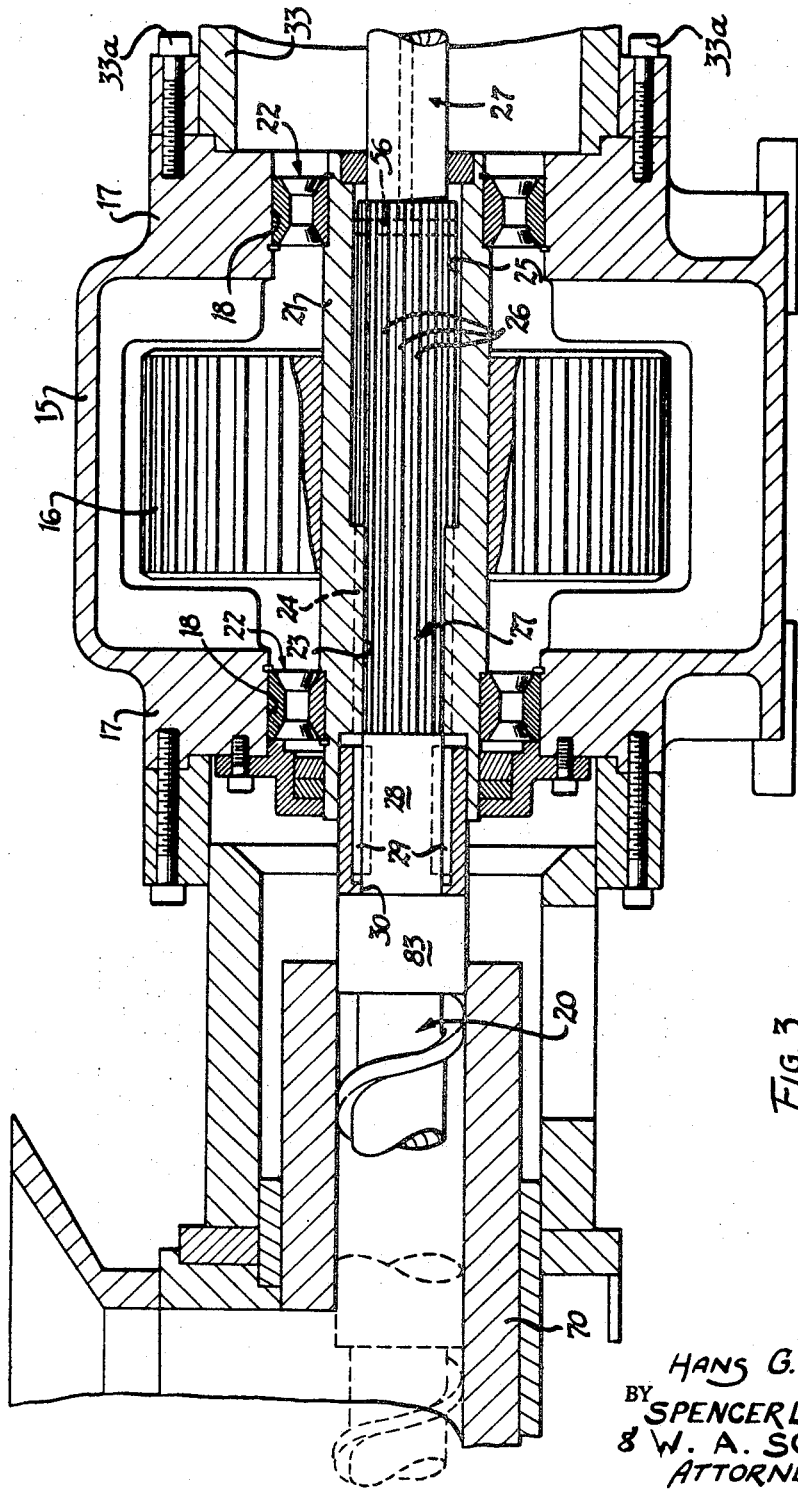
FIGURE 3 is a view similar to FIGURE 2 illustrating a further portion of the apparatus.

As shown in the drawings:

In FIGURE 1 of the drawings, reference numeral 10 refers generally to a machine base upon which is mounted a hydraulic pump 11 adapted to be driven by suitable means, such as an electric motor (not shown), and supplying fluid under pressure, as through conduit 12, to a hydraulic motor 13. The output shaft 14 of this motor 13 is coupled to a speed change mechanism enclosed within a housing 15. The type of speed change mechanism within the housing 15 is unimportant, but may suitably comprise a plurality of intermeshing gears of such size and relative ratio as to drive an output gear 16 (FIGURE 3) at a desired speed. This output gear 16 is also enclosed within the housing 15 in axial alignment with a plasticizer screw 20 to be hereinafter more fully explained in detail.

The housing 15 is provided with spaced inwardly projecting abutments 17 defining inner cylindrical apertures 18. The gear 16 is mounted upon a cylindrical, separate hub 21 to which the gear 16 is keyed or otherwise fixed for co-rotation and against axial displacement. Interposed between the hub 21 and the apertures 18 of housing 15 are anti-friction bearings 22. The bearings 22 thus support the gear 16 and the hub 21 for rotation within the housing, the gear 16 being driven at a speed determined by the ratio of the gear set enclosed within the housing 15 and the speed of the hydraulic drive motor 13.

It will be noted that the gear hub 21 is provided with an interior bore 23 having radially enlarged splines 24, the bore 23 being enlarged at its right hand end, as at 25, to a radial dimension greater than the root diameter of the splines 24. Engaged in the splines 24 are exterior splines 26 formed on the exterior surface of a screw extension indicated generally at 27. The splines 26 of the screw extension 27 are substantially longer than the splines 24 of the hub 21, by virtue of the fact that the hub bore 25 is enlarged or relieved, as at 25.

The splined screw extension 27 is provided with a forward, reduced diameter, non-splined portion 28 which is keyed, by keys 29, into a recess 30 formed at the rear end of the screw 20, so that the screw and the splined screw extension 27 are secured together for joint rotative and longitudinal displacement.

The screw extension 27 projects axially beyond the change speed gear housing 15 for enclosure within a fluid pressure cylinder 33 secured to the rear end of the housing 15, as by cap screws 33a. This fluid pressure cylinder 33 is closed at its rear end by a massive closure plate 34 having a pressure port 35 adapted to receive fluid under pressure as hereinafter described in detail, as through conduit 36.

Disposed within the cylinder 33 is a fluid pressure actuated piston indicated generally at 38 and comprising a cylindrical central plate 39 and a pair of side plates 40 secured through the center plate by suitable means, as by cap screws 41. Secured to the piston are annular sealing elements having outer peripheral sealing portions 42 contacting the inner periphery 43 of the cylinder 33 and inwardly directed supporting portions 44 clamped by the plates 40 against the side surfaces of the center plate 39, respectively, by the screws 41.

The inner one of the plates 40 has secured to the inner face thereof a bearing race 45 and a complementary bearing race 46 is carried by a mounting block 47 which is secured to the free rear end of the screw extension 27 for co-rotation therewith by suitable means, as by key 48.

Also carried by the screw extension 27, or more specifically by the mounting plate 47, is a lubricating extension rod 50. This rod 50 is threaded at its forward end into the block 47, as at 51, and is provided with an axial bore 52 through which extends a lubricating tube 53, this tube 53 being snugly confined within a bore 54 in the block 47 for communication with an axial lubricating passage 55 in the shaft extension 27 to terminate at the splines 26 in a diametric lubrication passage 56. The rear end of the tube 53 terminates at the rear end of the extension rod 50 in a self-sealing lubrication fitting 57.

Concentrically surrounding the rod 50 is a tubular housing 60 secured at its forward end to the piston 38 and projecting beyond the cylinder end plate 34. Interposed between the forward end of the rod 50 and the tube 60 is an anti-friction bearing 61 which accommodates rotation of the rod 50 with the screw extension 27 inwardly of the rotationally fixed piston 38 and tube 60. A second anti-friction bearing 62 is interposed between the rear end of the rod 50 and the rear end of the tube 60. Threadedly mounted at the exterior of the tube 60 and at the outer extremity thereof is a limit switch actuating collar 63 which is provided with an enlarged peripheral rib 64.

This collar 63 is threadedly adjustable on the tube 60 to adjust the position of the actuating collar rib 64 relative to the tube. Further adjustment is provided by splitting the rib, as at 65, and providing a set screw 66, so that the rear, chamfered actuating surface 67 of the collar rib can be minutely adjusted by adjustment of the set screw 66. The open rear end of the tube is closed by an interiorly threaded cap 68 which provides access to the grease fitting 57.

Figure 4:
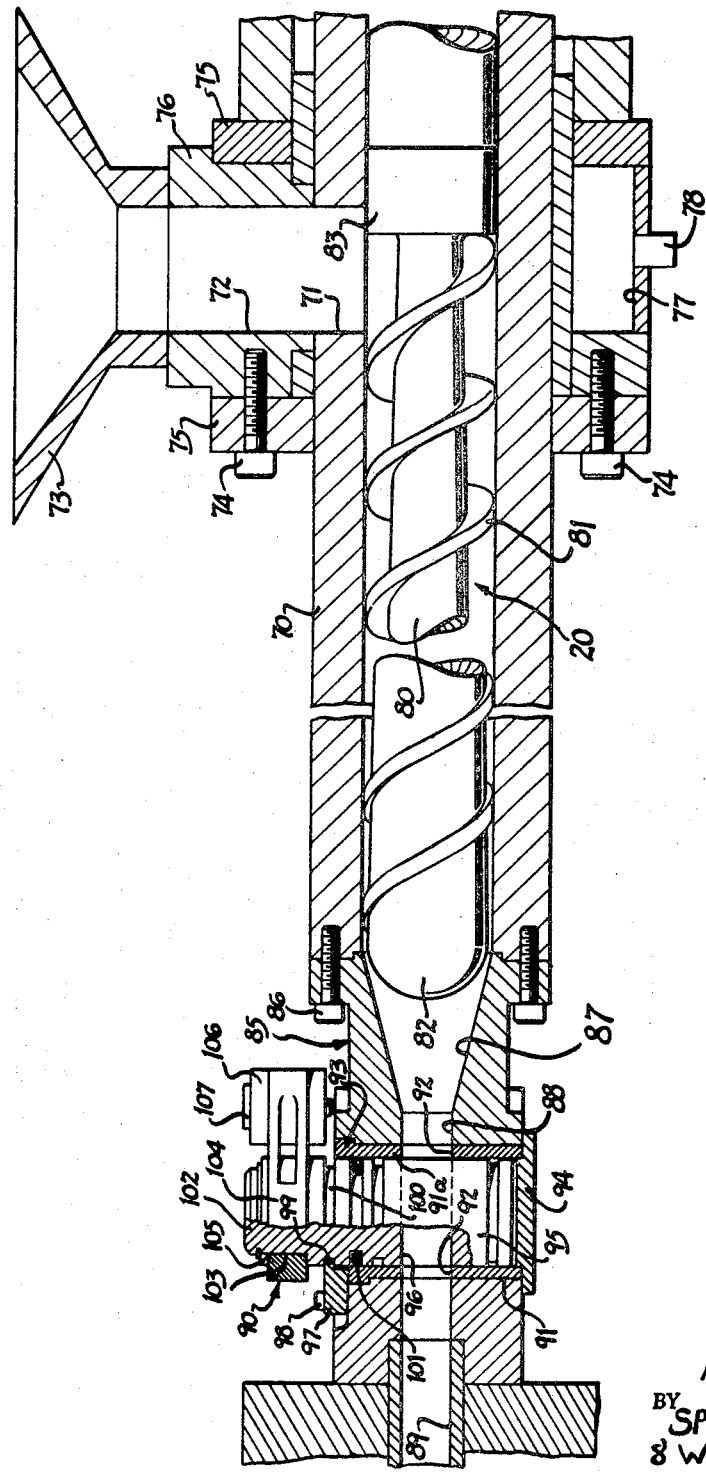
FIGURE 4 is a view similar to FIGURES 2 and 3 illustrating the remainder of the apparatus.

Referring now to FIGURE 4 of the drawings, it will be seen that the screw 20 is enclosed within a cylindrical barrel 70, this barrel 70 being provided with a vertical aperture 71 registering with an overhead solid plastic material inlet passage 72 which in turn communicates with the interior of an overhead supply hopper 73. The inlet passage 72 is defined interiorly of a hopper mounting block 76 secured, as by cap screws 74, to a pair of spaced mounting plates 75. Preferably, the hopper mounting block 76 is cooled, as by circulating water through a water flow passage 77 provided with a suitable inlet and with a drain outlet 78.

The screw 20 is of more or less conventional design inasmuch as it consists of a central, axially extending center section 80 about which is disposed a helical screw flight 81. The diameter of the central section 80 increases in diameter toward the forward, free end or nose 82 of the screw. Thus, the base or root diameter of the screw flight decreases toward the outlet end 82 of the screw and, accordingly, solid plastic material introduced onto the screw through the inlet opening 71 is subjected to increasing pressure as this material advances along the length of the screw until finally the material is discharged from the nose 82 of the screw at a relatively high pressure.

Located at the rear end of the screw 20 is a cylindrical blocking portion 83 which serves to effectively block off the escape of pelletized or plasticized material over the rear end of the screw. As heretofore described, the screw is provided with the extension 27 which is co-rotatable and axially displaceable with the screw and which serves to connect the screw with the drive gear 16 and with the reciprocable fluid pressure actuated piston 38.

The forward end of the barrel 70 is secured to a generally cylindrical nose block 85 by suitable means, as by cap screws 86. This nose block is provided with a tapered, frusto-conical inner recess 87 smoothly tapering from the inner diameter of the barrel 70 to the diameter of a relatively smaller cylindrical passage 88. This passage 88 is in direct communication with a mold cavity (not shown), as through a mold feed passage 89.

To control communication between the screw and the mold cavity, a material flow valve, indicated generally at 90, is interposed in the passage 88. This valve may suitably comprise a valve sleeve 91 which is generally cylindrical in configuration and which is provided with lateral ports 92 establishing communication between the passage 88 and the cylindrical interior 91a of the valve sleeve. The valve sleeve 91 is retained in its vertical position of FIGURE 4 by means of a laterally outwardly enlarged shoulder 93 seated in a countersunk recess in the block 85. A lower closure plate 94 closes the open lower end of the sleeve 91.

Disposed within the valve sleeve 91 is a generally cylindrical valve body 95, this valve body having a transverse opening 96 adapted for registration or non-registration with the sleeve ports 92 to accommodate the flow of plasticized material therethrough. The valve body 90 is retained in the sleeve 91 by means of a holddown block 97 secured to the block 85 by suitable means, as by cap screws 98, the hold down block having a laterally projecting finger 99 entered in a peripheral recess 100 formed in the valve body exteriorly of the block 85. The valve body is provided with an upper peripheral seal 101 bearing against the inner periphery 91a of the sleeve 91.

The valve body also is provided with an upper embossment 102 projecting above the block 85 and provided with a peripheral recess 103. Seated within this recess is an actuating arm 104 secured therein by an annular retaining ring 105. As best shown in FIGURE 1, the actuating arm 104 is secured at its outer extremity, as by clevise 106 and pivot pin 107 to the free end of the actuating rod 108 of a fluid pressure actuated cylinder 109. Extension of the actuating rod 108, as by actuation of the cylinder 109 will pivot the arm 104 in such a manner as to turn the valve body 95 to a position at which the valve body passage 96 is out of registration with the material passage 88 of the block 85 and the sleeve apertures 92.

In FIGURE 5 of the drawings, there is illustrated a different form of actuating piston for the screw 20.

More specifically, the cylinder 170 is closed by rear closure plate 171 secured thereto by suitable means, as by cap screws 172, this closure plate having a port 173 through which fluid under pressure can be introduced into the cylinder 170, as through a conduit 174.

Located within the cylinder 170 in full peripheral engagement with the interior cylindrical surface 175 thereof is a generally cylindrical piston 176 secured, as by a key 177, to the screw extension 27 for co-rotation and for joint axial displacement. The piston 176 is provided at its rear face with a threaded aperture 178 coaxial therewith and receiving therein the threaded forward end 179 of extension rod 180 similar to the rod 50 heretofore described. It will be noted that this rod 180 carries at its rear end a switch actuating block 181, similar to the block 63 heretofore described, and that the member 180 is provided with a central grease-accommodating bore 182 communicating with the bore 55 of the screw extension 27 through a port 183 in the piston 176.

This piston 176 is provided at its outer periphery with a plurality of piston rings 184 engaging the inner cylindrical peripheral surface 175 of the cylinder 170. Additionally, the piston 176 has its rear face relieved, as at 185, to receive thereagainst fluid from the conduit 174 and the passage 173. The extension rod 180 is fixed to the piston by means of a set screw 186 threadedly received in an inclined passage in the piston and jammingly engaging the threaded end portion 179 of the extension 180.

Of course, the primary difference between that embodiment of the invention illustrated in FIGURE 5 of the drawings and that embodiment of the invention heretofore described resides in the fact that the piston 176 is freely rotatable within the cylinder 170, as well as being axially displaceable therein. In that embodiment of applicant's invention earlier described, the anti-friction bearing elements interposed between the bearing races 45 and 46 may be exposed to severe cocking loads upon any wear of the piston 40. Additionally, the non-metallic seals 42 are subject to substantial wear during continued operation of the machine and must be periodically replaced. By utilizing metallic piston rings 184 of the type conventionally utilized in automotive engines, the problem of seal replacement is avoided, while the elimination of the thrust bearing races 45 and 46 obviates the possibility of bearing breakage.

All in all, the simpler structure resulting from both rotational and axial displacement of the piston 176 results in a less expensive, more rugged, substantially trouble-free structure. Of course, the rod 180 rotates with the piston 176 and adequate seals 187 are provided in the cylinder block 171 to accommodate such rotation without leakage of actuating fluid from the cylinder 175.

*Control system*

The injection molding machine heretofore described is provided with a control system which, basically, is a combined position-responsive and timer actuated mechanism.

Figure 2:
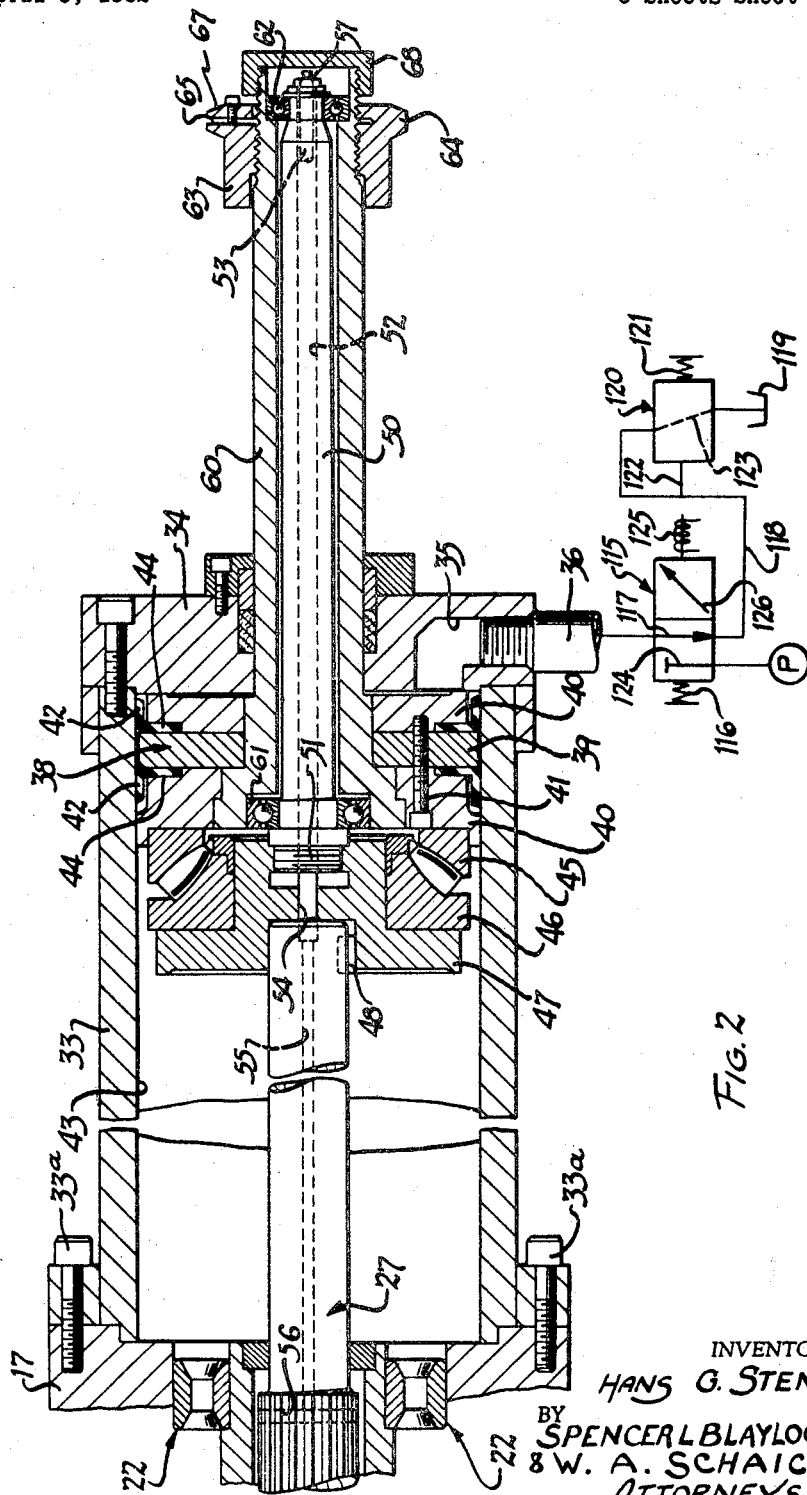
FIGURE 2 is a vertical sectional view through a portion of the apparatus.

More specifically, FIGURES 1 and 2 illustrate this control system, wherein longitudinal actuation of the piston 38 is under the control of a primary valve 115 interposed between a pump P and the fluid conduit 36 which communicates through the port 35 with the rear face of the piston 38. This pump P may be the driving pump 11 for the injection molding machine, or a supplemental pump may be provided if desired.

The normal position of the piston 38 is in its retracted or rearmost position as illustrated in FIGURE 2 wherein the valve 115 is urged to its illustrated position by means of a compression spring 116 so that the conduit 36 is connected by a valve passage 117 and a conduit 118 to a sump 119 through a pressure relief valve 120. This pressure relief valve 120 is of conventional type in that a compression spring 121 is counter-balanced against pressure in the line 118, by a branch line 122. The valve 120 interconnects the conduit 118 and the sump 119 by means of a relief valve passage 123 whenever pressure within the line 118 exceeds a desired value determined by the spring 121. When the conduit 36 is in communication with the valve passage 117, the pump communicates with a blind valve passage 124. Of course, the pump is provided with the necessary driving mechanism, such as an electric motor or the like, and with the desired pressure regulator and sump connection for dumping the output of the pump when it is connected with the blind passage 124.

The spring 116 normally urges the valve body 115 to its illustrated right-hand position, but the valve body 115 can be displaced to the left by means of an actuating solenoid 125. When the soleoid 125 is actuated to shift the valve body 115 to the left, the pump is connected to the line 36 by valve passage 126, so that fluid under pressure is delivered through the conduit 36 and the passage 35 to the rear face of the piston 38 to displace the piston to the left. At this time, the drain conduit 118 is connected to a blind valve passage 127 of the valve body 115.

That embodiment of the invention utilizing the cylinder 170 and the piston 176 illustrated in FIGURE 5 of the drawings may be controlled by an identical control circuit with that illustrated in FIGURE 2 of the drawings, the conduit 174 serving to conduct fluid under pressure from the control valve 115 into the cylinder space.

From FIGURE 1, it will be seen that the piston rod 108 for the valve 90 is actuated by a cylinder 130. This cylinder 130 is of the double acting type and is adapted to have fluid introduced into the rear end thereof through line 131 to extend the rod 108 and open the valve 90 or to have fluid introduced through the line 131 to retract the piston rod 108, thereby closing the valve 90.

The operation of the cylinder 130 is under the control of a four-way control valve 135 which is normally positioned by compression spring 136 in its illustrated position of FIGURE 1 wherein the line 131 is connected to a sump 137 by valve passage 138 while line 132 is connected to the pump P, which may be the pump 11 or a separate controlled pressure pump, as desired, through valve passage 139. The valve 135 is adapted to be shifted from its illustrated position by means of a solenoid 140, the valve when so shifted connecting the forward end of the cylinder 130 by line 132 and valve passage 141 with the sump 137 and simultaneously connecting the pump P with the rear end of the cylinder through valve passage 142 and line 131.

Thus, valve 135 is normally effective to actuate the cylinder 130 to its illustrated, retracted, valve-closing position and is actuated by the solenoid 140 to its non-illustrated, extended, valve-opening position.

As earlier explained, the pump 11 serves to actuate the screw for rotation by means of the hydraulic motor 13. Interposed in the fluid pressure conduit 12 connecting the pump and the motor 13 is a control valve 150 normally urged by a spring 151 to its illustrated position at which the output of the pump 11 is directed to a sump 152 by means of valve passage 153. The valve body 150 can be shifted by means of a solenoid 155 to a non-illustrated position at which valve flow passage 156 is interposed in the line 12 to drivingly interconnect the pump 11 and the motor 13.

Positioned adjacent the rear end of the screw extension for contact with the actuating collar 64 are a pair of limit switches, LS1 an LS2, respectively. The limit switch LS2 is positioned to be actuated when the screw is in its rearmost position, while the limit switch LS1 is adapted to be actuated when the screw is in its forward position illustrated in FIGURE 4 of the drawings.

Illustrated in FIGURE 1 is the control circuit correlating actuation of the valves 115, 135 and 150, this control circuit including lead lines 160 connected to a suitable source of electricity.

The solenoid 155 for the valve 150 is connected to one of the lead lines 160 by conductor 161 and is connected to the other lead line 160 by conductor 162 having interposed therein a circuit relay CR, the normally closed limit switch LS2 and the normally open limit switch LS1 by-passed by the contacts CR1 of the relay CR.

The windings of valve-actuating solenoids 125 and 140 are interconnected by conductor 163 and are connected to one of the lead lines by conductor 164. Interposed in a conductor 165 leading to the other lead line 160 is a timer T and contacts CR2 of the relay CR, these contacts CR2 being normally closed.

*Operation*

In the operation of the device of the present invention, it will be assumed that the machine is in its condition of FIGURES 1 and 2, i.e., in a condition at which the screw 20 is fully retracted, the space between the forward end of the screw 20 and the valve 90 is filled with plasticized material. The limit switch LS1 is in its normally open condition, and the limit switch LS2 is contacted by the actuating element 64 to open this limit switch from its normally closed position.

The valves 115, 135 and 150 are in their illustrated, non-actuated conditions. To initiate actuation of the mechanism, the timer T is actuated to simultaneously energize the solenoids 125 and 140. Actuation of the solenoid 125 displaces the valve body 115 from its illustrated position so as to connect the conduit 36 to the pump P, thereby actuating the screw to the left, i.e., in a mold charging direction. Simultaneously, actuation of the solenoid 140 moves the valve body 135 to the left against the spring 136 to extend the piston rod 108 and open the valve 90 to accommodate the flow of plasticized material ahead of the screw and through the passages 88 and 96 into the mold charging passage 89. This action continues until the limit switch LS1 is actuated.

Upon forward displacement of the screw, the screw extension, of course, moves with the screw, thus allowing limit switch LS2 to assume its normally closed position. Thus, upon closure of limit switch LS1, the relay CR is energized, opening the normally closed circuit for the solenoids 125 and 140. The valves 115 and 135 thus are actuated by their respective springs to their illustrated, non-active positions to connect the cylinder 33 to the sump 119 by means of the valve passage 117 and the pressure regulator valve 120 and to close the valve 90, respectively.

Simultaneously, i.e., upon closure of LS1, the solenoid 155 is energized to shift the valve 150 to its non-illustrated position interconnecting the pump 11 and the motor 13. The resultant driving of the motor 13 will rotate the drive gear 16 and, through the sleeve or hub 21 and the screw extension splines 26, drive the screw 20. Driving of the screw forces plasticized material along the length of the screw. This material cannot escape through the closed valve 90, and the pressure of this material displaces the screw rearwardly against the resistance of the cylinder 33 as determined by the pressure regulator valve 120.

Of course, such rearward displacement of the screw 20 will open the limit switch LS1, but such opening of the limit switch LS1 will not de-energize the solenoid 155 because of the holding relay contacts CR1. When the screw has been driven back by the pressure of plasticized material to the full extent of its retraction, the normally closed limit switch LS2 is opened and the circuit for the solenoid 155 will be broken, thus restoring the machine to the above-defined initial position and conditioning the machine for its next cycle.

I claim:
1. In an injection molding machine of the type wherein a rotatable plasticizer screw is displaced axially toward an injection mold to fill the mold and retracted axially to accumulate the next successive mold filling charge, the improvements of means supporting the screw for both rotation and axial displacement comprising a drive gear having an axial bore provided with axially extending splines, means for driving said gear, said screw having an extension thereon coaxial with the plasticizing portion thereof and including a first splined portion projecting into said gear bore in intermeshing relation therewith so that rotation of said gear drives said screw and a second non-splined portion projecting beyond the first portion, a fluid pressure actuated cylinder peripherally surrounding said second portion of said screw extension, a non-rotatable longitudinally displaceable piston disposed interiorly of said cylinder, and bearing means disposed interiorly of said cylinder and interconnecting said second screw extension portion and said piston and including a first bearing race fixed to said piston for non-rotatable longitudinal displacement therewith, a second bearing race fixed to said shaft extension for rotation therewith and non-friction elements interposed between said races, whereby said screw is axially displaceable relative to said gear and rotatable relative to said piston.

2. In an injection molding machine of the type wherein a rotatable plasticizer screw is displaced axially toward an injection mold to fill the mold and retracted axially to accumulate a next successive mold filling charge, the improvements of means supporting the screw for both rotation and axial displacement comprising a drive gear fixed against axial displacement and having an axial bore provided with axially extending splines, means for driving said gear, an extension on said screw having a splined portion projecting into said gear bore in intermeshing relation therewith so that rotation of said gear drives said screw, the gear splines and the intermeshing extension splined portion accommodating relative axial displacement of the screw and the gear, a fluid pressure actuated cylinder peripherally surrounding a portion of said screw extension, a non-rotatable longitudinally displaceable piston disposed interiorly of said cylinder, and bearing means interconnecting said screw extension and said piston, said bearing means being completely confined in said fluid pressure actuated cylinder and including a first rotationally fixed bearing race fixed to said piston, a second rotatable bearing race fixed to said shaft extension and non-friction elements interposed between said races.

3. In an injection molding machine of the type wherein a rotatable plasticizer screw is adapted to be longitudinally displaced in a first direction to inject an accumulated charge of plasticized material into a mold and to be longitudinally displaced in a reverse direction to accumulate a successive charge of plasticized material, the improvements of means correlating rotative and longitudinal motion of said screw with a molding operation comprising actuating means for displacing the screw in said first mold-filling direction, separate means for resisting displacement of said screw in said reverse accumulating direction, valve means interposed between the screw and the mold and movable to open and closed positions, motor means for rotating the screw, and a control system including means actuated by displacement of the screw in said first direction for substantially simultaneously (1) actuating said valve means to its closed position, (2) halting said actuating means and (3) actuating said motor means to rotate the screw, and means responsive to displacement of said screw in its reverse direction of travel against the separate means to halt actuation of said motor means.

4. In an injection molding machine of the type wherein a rotatable plasticizer screw is displaced axially toward an injection mold to fill the mold and retracted axially to accumulate the next successive mold filling charge, the improvements of means supporting the screw for both rotation and axial displacement comprising a drive gear having an axial bore therethrough, means for driving said gear, an extension on said screw concentric with said gear and projecting through said gear bore, means interposed between said gear and said shaft extension securing said gear and said extension for co-rotation but accommodating relative axial displacement thereof, a fluid pressure actuated cylinder peripherally surrounding a portion of said screw extension exteriorly of said gear, a non-rotatable longitudinally displaceable piston disposed interiorly of said cylinder, and bearing means disposed interiorly of said cylinder and interconnecting said screw extension and said piston for relative rotation and for joint axial displacement.

5. In an injection molding machine of the type wherein a rotatable plasticizer screw is adapted to be longitudinally displaced in a first direction to inject an accumulated charge of plasticized material into a mold and to be longitudinally displaced in a reverse direction to accumulate a successive charge of plasticized material, the improvements of means correlating rotative and longitudinal motion of said screw with a molding operation comprising a fluid pressure actuated cylinder for displacing the screw in said first mold-filling direction, a valve interposed between the screw and the mold and movable from an open position to a closed position, fluid pressure actuated means for moving said valve, a fluid pressure actuated motor for rotating the screw, means responsive to displacement of the screw in said first direction for simultaneously (1) actuating said valve actuating means so as to move said valve to a closed position, (2) stopping actuation of said cylinder and (3) actuating said fluid pressure actuated motor to rotate the screw, and means responsive to displacement of said screw in said reverse direction of travel to halt actuation of said motor.

6. In an injection molding machine of the type wherein a rotatable plasticizer screw is displaced axially toward an injection mold to fill the mold and retracted axially to accumulate the next successive mold filling charge, the improvements of means supporting the screw for both rotation and axial displacement comprising a drive gear having an axial bore provided with axially extending splines, means for driving said gear, said screw having an extension thereon coaxial with the plasticizing portion thereof and including a first splined portion projecting into said gear bore in intermeshing relation therewith so that rotation of said gear drives said screw and a second non-splined portion projecting beyond the first portion, a fluid pressure actuated cylinder peripherally surrounding said second portion of said screw extension, a rotatable longitudinally displaceable piston disposed interiorly of said cylinder, and means interconnecting said second screw extension portion and said piston, whereby said screw is axially displaceable relative to said gear and is both axially and rotationally displaceable with said piston.

7. In an injection molding machine of the type wherein a rotatable plasticizer screw is displaced axially toward an injection mold to fill the mold and retracted axially to accumulate the next successive mold filling charge, the improvements of means supporting the screw for both rotation and axial displacement comprising a drive gear having an axial bore therethrough, means for driving said gear, an extension on said screw concentric with said gear and projecting through said gear bore, means interposed between said gear and said shaft extension securing said gear and said extension for co-rotation but accommodating relative axial displacement thereof, a fluid pressure actuated cylinder peripherally surrounding a portion of said screw extension exteriorly of said gear, a freely rotatable longitudinally displaceable piston disposed interiorly of said cylinder, means interconnecting said screw extension and said piston for joint rotation and for joint axial displacement, and a plurality of peripheral piston rings sealingly engaging the interior surface of said cylinder.

References Cited by the Examiner

UNITED STATES PATENTS

| 2,505,540 | 4/50 | Goldhard | 18—30 |
| 2,629,132 | 2/53 | Willcox et al. | |
| 2,734,226 | 2/56 | Willert | 18—12 |
| 2,881,477 | 4/59 | Triulzi | 18—30 |
| 2,890,491 | 6/59 | Hendry | 18—55 |
| 2,899,710 | 8/59 | Hendry | 18—55 |
| 3,020,591 | 2/62 | Breher et al. | 18—30 |

FOREIGN PATENTS

| 1,105,967 | 7/55 | France. |
| 570,680 | 12/57 | Italy. |
| 599,242 | 10/59 | Italy. |

MICHAEL V. BRINDISI, *Primary Examiner.*